(12) United States Patent
Julien

(10) Patent No.: US 10,969,020 B2
(45) Date of Patent: Apr. 6, 2021

(54) GATE VALVE WITH VALVE BODY LINER

(71) Applicant: Australian Rubber Products Pty Ltd, Artarmon (AU)

(72) Inventor: Gerard Julien, Artarmon (AU)

(73) Assignee: AUSTRALIAN RUBBER PRODUCTS PTY LTD, New South Wales (AU)

( * ) Notice: Subject to any disclaimer, the term of this patent is extended or adjusted under 35 U.S.C. 154(b) by 0 days.

(21) Appl. No.: 16/088,883

(22) PCT Filed: Apr. 5, 2017

(86) PCT No.: PCT/AU2017/050295
§ 371 (c)(1),
(2) Date: Sep. 27, 2018

(87) PCT Pub. No.: WO2017/173492
PCT Pub. Date: Oct. 12, 2017

(65) Prior Publication Data
US 2019/0107208 A1      Apr. 11, 2019

(30) Foreign Application Priority Data

Apr. 7, 2016 (AU) ................................ 2016901287

(51) Int. Cl.
*F16K 3/02* (2006.01)
*F16K 27/04* (2006.01)

(52) U.S. Cl.
CPC .......... *F16K 3/0227* (2013.01); *F16K 3/0281* (2013.01); *F16K 27/044* (2013.01)

(58) Field of Classification Search
CPC ........ F16K 3/02; F16K 3/0227; F16K 3/0245; F16K 3/0281; F16K 27/044; F16K 52/02
See application file for complete search history.

(56) References Cited

U.S. PATENT DOCUMENTS

| 2,829,862 | A | 4/1958 | Wey |
| 3,917,223 | A | 11/1975 | Sidler et al. |
| 3,993,092 | A | 11/1976 | Still |
| 4,026,517 | A | 5/1977 | Still |

(Continued)

FOREIGN PATENT DOCUMENTS

| AU | 2011218775 B2 | 3/2013 |
| DE | 10112642 A1 | 9/2002 |
| WO | 02095273 A1 | 11/2002 |

*Primary Examiner* — Hailey K. Do
(74) *Attorney, Agent, or Firm* — Breiner & Breiner, L.L.C.

(57) ABSTRACT

Gate valve including a valve body having first and second parts, each having an interface surface for engagement with the interface surface of the other part, and an aperture for receiving a fluid flow conduit. The parts when secured together define a gate recess and a flow conduit between the apertures. A gate in the recess moves between closed and open positions to control fluid flow through the gate. A valve body insert lines interior surfaces of the gate recess and receives the valve gate. A body portion sits between apertures of the two parts, sealing against the gate in a closed position. A gate wiper seal forms a fluid seal against the gate and an outer open end of the sleeve portion. The two parts have a recess portion at a gate recess end. The sleeve portion has a collar portion sealingly seated within the recess portion.

15 Claims, 4 Drawing Sheets

(56) References Cited

U.S. PATENT DOCUMENTS

| | | | |
|---|---|---|---|
| 4,051,863 | A | 10/1977 | Still |
| 4,201,365 | A * | 5/1980 | Paptzun ............... F16K 3/0263 251/326 |
| 4,279,402 | A | 7/1981 | Wey et al. |
| 4,522,224 | A | 6/1985 | Stalder et al. |
| 4,546,788 | A | 10/1985 | Stalder et al. |
| 4,646,407 | A | 3/1987 | Mayhew, Jr. |
| 4,646,777 | A | 3/1987 | Stalder et al. |
| 4,703,915 | A | 11/1987 | King |
| 4,742,990 | A | 5/1988 | Stalder et al. |
| 4,773,627 | A * | 9/1988 | King .................... F16K 3/0281 251/328 |
| 4,785,844 | A | 11/1988 | Pankov |
| 4,951,919 | A * | 8/1990 | Haglund ............... F16K 3/0281 251/328 |
| 5,178,180 | A | 1/1993 | Parris et al. |
| 5,193,577 | A | 3/1993 | de Koning |
| 5,205,317 | A | 4/1993 | Neuerberg et al. |
| 5,330,158 | A * | 7/1994 | Ellich .................. F16K 3/0281 251/327 |
| 5,413,140 | A | 5/1995 | Kimpel et al. |
| 5,549,278 | A | 8/1996 | Sidler |
| 5,582,200 | A | 12/1996 | Kimpel et al. |
| 6,010,112 | A | 1/2000 | Sidler |
| 6,558,729 | B1 | 7/2003 | Kimpel |
| 7,014,164 | B2 | 3/2006 | Sidler |
| 7,089,961 | B2 | 8/2006 | Morton et al. |
| 7,300,034 | B2 | 11/2007 | Shields |
| 7,309,057 | B2 | 12/2007 | Santiago |
| 7,946,556 | B1 | 5/2011 | Trott |
| 8,235,355 | B2 | 8/2012 | Sidler |
| 8,261,771 | B2 | 9/2012 | Witkowski et al. |
| 8,327,870 | B2 | 12/2012 | Sidler |
| 8,365,760 | B2 | 2/2013 | Sidler |
| 8,465,001 | B2 | 6/2013 | Witkowski et al. |
| 8,727,316 | B1 | 5/2014 | Miao et al. |
| 8,978,695 | B2 | 3/2015 | Witkowski et al. |
| 8,998,168 | B2 | 4/2015 | Witkowski et al. |
| 2005/0285071 | A1 | 12/2005 | Williams et al. |
| 2011/0079302 | A1 | 4/2011 | Hawes |
| 2013/0202457 | A1 | 8/2013 | Bayyouk et al. |
| 2014/0021397 | A1 | 1/2014 | Painter |
| 2014/0332707 | A1 | 11/2014 | Reilly et al. |
| 2016/0076657 | A1 | 3/2016 | Watterodt et al. |

* cited by examiner

GATE VALVE WITH VALVE BODY LINER

FIELD OF THE INVENTION

The present invention relates to gate valves and in particular knife gate valves for the use in industrial environments to control flows of potentially caustic or corrosive fluids and abrasive slurries.

BACKGROUND TO THE INVENTION

Gate valves are a common type of fluid flow control device used in industrial plants throughout the world. In essence, gate valves are used in pipelines or other conduits for the interruption and/or control of fluid flow. A sliding gate arranged within a housing defining a flow conduit serves as a closing element by sliding across the flow path to stop fluid flow. To open the valve, the gate slides partially or fully out of the flow path to allow fluid flow. Their simple design allows the pressure drop across an open gate valve to be minimal which helps maintain fluid flow efficiencies throughout the plant.

One widely used type of gate valves are knife gate valves. These valves are often used where highly abrasive and/or corrosive slurry flows through pipelines are to be controlled, primarily as shut-off valves (as compared to other types of flow control such as throttling).

Generally, such knife gate valves comprise a valve housing of lower grade stainless, ductile iron or carbon steel, defining a flow-conduit, e.g. with circular cross-sections having a diameter of between 5 cm to in excess of 100 cm, extending between opposite housing openings which are surrounded by respective flanges by way of which the valve housing is sealingly connected in-line between two pipeline sections. A 'sheath' portion of the housing, usually termed a chest, serves to accommodate and allow displacement of a flat blade (ie the gate) of high grade stainless steel or exotic alloy (for the necessary corrosion resistance and strength) radially into and out of the flow conduit, to completely shut-off or fully clear passage of slurry (or other fluids) through the valve. The knife blades can have a thickness from about 10 mm to more than 50 mm, depending on the pressure and flow rating of the valve, and conduit diameter. The metals employed in particular for the knife are expensive but necessary to survive the corrosive environment within the pipeline. It is also known to line or coat the knife gates with corrosion and abrasion resistant materials.

Movement of the gate within the chest is effected using plunger rods coupled to hand wheels or bevel gears for manual displacement, or it can be fitted with all types of pneumatic, hydraulic and electro-mechanical actuators to effect on/off flow isolation through the valve. Noting that the invention is not concerned with the way the knife gate is operated, no further reference will be made here to such mechanisms, and reference should be had instead to specialist literature and manufacturer materials and/or to the prior art documents mentioned below for additional details.

It is customary for knife gate valves to have multi-piece or single corrosion resistant liners of polymer or composite material incorporated into the valve housing to cover the housing surfaces inside the chest portion which receives the knife blade, and the flow conduit. The liners are devised to protect the housing from corrosion and to form a seal against the knife gate. Integral liners will be referred herein also as valve inserts, given that these are received within the valve housing.

Knife gate valves can also be divided into unidirectional- and bidirectional knife gate valves, wherein a main difference resides in the sealing arrangement employed between gate and flow conduit, i.e. whether the sealing sleeve disposed about the flow conduit (or channel) defined within the valve body (or housing) is only in contact with one face of the gate or always in contact with both faces of the gate whilst it moves, see eg US patent document 2016/0076657

U.S. Pat. No. 8,727,316 B1 describes a knife gate valve with a two piece housing, wherein the housing halves are mirror symmetrical, and each have a recessed zone for securely frictionally seating one half of a two-piece elastomeric liner which defines, in the assembled state of the housing, a rectangular cavity in which the displaceable knife gate is seated as well as a flow channel through which fluid may pass through the valve. A one-piece wiper collar of elastomeric material defines a rectangular channel for passage of the gate (or knife plate) and is fully mounted within a rectangular recess to close an upper open end of the assembled liner halves; a slot formed in the upper wall of the two housing parts serves as a passage for the gate.

In contrast, U.S. Pat. Nos. 4,026,517, 4,051,863 and 4,951,919 illustrate and describe what may be termed true one-piece (ie integral) chest and flow conduit liners in as much as these are of unitary construction and comprised of an annular portion which is seated in and covers the inner surfaces of the flow conduit defined within and by the valve housing, and a generally thin, box-like sheath or sleeve portion that covers the chest channel defined within the valve housing for seating the knife gate. These designs have the advantage over that of US '316 of avoiding potential leakage paths at the interface defined at the symmetry plane where the two housing halves are mated to each other. However, it is believed that the variously proposed complex sealing mechanisms at the upper edge of the sleeve portion of the one-piece liner (which are variations of a gland seal) are too complex and provide possible leakage paths/scenarios that may remain undetected for some time.

In U.S. Pat. No. 4,051,863, the sleeve portion of the one piece liner terminates in a size-enlarged rectangular collar portion that sits outside on top an upper end surface of the housing/casing parts. The enlarged portion is seated within a cavity formed in the stuffing box which is tensioned against the upper face of the valve housing to secure the liner against being pulled-out when the gate plate is retracted against substantial friction to allow slurry passage through the valve. A plurality of horizontally oriented spaced apart seal beads integrally formed on the walls surrounding the gate passage channel of the sleeve's collar are provided to prevent flow of fluid intermediate the gate plate and collar.

In contrast, the sealing mechanisms proposed by U.S. Pat. Nos. 4,026,517 and 4,951,919 involve having an enlarged terminal collar portion seated within a correspondingly enlarged recessed zone of the valve housing parts, below the upper face of the valve housing. Various and differently shaped packing/sealing ring components which cooperate in providing a sealing arrangement are pressed against the upper end of the collar portion to assist in preventing fluid passage between the interfaces created along the opposite faces of the gate plate (knife) extending through these components.

All these various sealing arrangements/mechanisms still leave room for improvement as regards count/number of components required to achieve satisfactory leakage prevention and, equally relevant, early leakage detection.

Unfortunately, over time the compression seal between the sealing elements bearing against the knife gate may be compromised as these invariably wear from sliding against the knife gate, particularly when the fluid flow pressures within the flow conduit are high. Any fluid leakage will usually drain along concealed surfaces within the valve housing and drip to the floor. As the valve housing components are significantly less corrosion resistant, the concealed surfaces exposed to the fluid eventually corrode. As the concealed surfaces are hidden from view, the corrosion escapes any casual visual inspection of the valve. A proper evaluation of whether maintenance is necessary requires disassembly of the gate valve.

Removing and disassembling the gate valve is laborious and time consuming in itself but the main disadvantage is the cost associated with plant downtime. On the other hand, catastrophic failure of the valve can cause far more damage and the down time for repairs can be far more expensive.

SUMMARY OF THE INVENTION

With these issues in mind, the present invention provides a knife gate valve comprising: a valve body (also termed housing) having first and second body parts, the first and second body parts each having an interface surface for engagement with the interface surface of the other body part, and an aperture for receiving an end of a fluid flow conduit, wherein the body parts are shaped such that when secured together at the interface surfaces they define a valve gate recess and a flow conduit between the apertures; a valve gate arranged for reciprocating movement in the gate recess between a closed position in which fluid flow through the flow conduit is prevented, and an open position allowing fluid flow past the valve gate; a valve body insert (also termed liner) having a sleeve portion for lining all interior surfaces of the gate recess and slideably receiving the valve gate, and an annular body portion integrally formed with the sleeve portion and configured to sit between the apertures of each of the two body parts and seal against the valve gate in a closed position; and a gate wiper seal to form a fluid seal against the valve gate (yet allow reciprocating movement thereof) and an open end of the sleeve portion; wherein, the first and second body parts have an enlarged recess portion at the gate recess end remote from the annular body portion, and wherein the sleeve portion has an enlarged terminal collar portion shaped to be sealingly seated fully within the enlarged recess portion substantially flush with an exterior face of the valve body, the terminal collar portion having an end recess configured to accommodate the gate wiper seal within the enlarged collar portion substantially flush with the exterior face of the valve body.

The valve body insert (or liner) is advantageously a one-piece component, eg manufactured using known moulding techniques for elastomeric materials. The liner's sleeve portion lines all the interior faces of the valve's gate recess. It is integrally formed with the annular body of the liner which lines the fluid passage within the valve body. The integral configuration avoids any interfaces between the components which perform separate lining functions, and which would require additional leakage prevention measures. Relevantly, the sleeve portion is configured with an enlarged, terminal collar portion that itself terminates flush with an upper terminal face of the housing (valve body), and has a substantial recess into which the gate wiper seal (also simply termed gate seal) is received. The recess is configured to have dimensions corresponding generally to those of the gate seal, to provide for a slight compression fit, whereby a substantially enlarged sealing surface area is created between gate seal and the upper end of the liner, in comparison to the more discrete sealing beads/rings used in prior art knife gate valve sealing arrangements. This measure improves leakage containment, and where leakage does occur, it is contained within the sleeve and directed to exterior surfaces of the valve body. Leakage on the exterior of the valve housing, rather than concealed within internal surfaces, is readily apparent during visual inspections, as is any corrosive damage to the valve.

Preferably, the gate valve further comprises a gate seal follower arranged for selectively and adjustably compressing the gate seal within the recess formed in the enlarged collar portion of the sleeve portion, to increase contact pressure between the valve gate and the gate seal, as well as the contact pressure between the enlarged collar portion of the sleeve portion and the gate seal.

The Applicants have found that fitting the gate seal, which advantageously could be an elastomeric annular body with or without an internal reinforcement, to and within the sleeve portion, to seal against the valve gate and the sleeve portion, provides a much improved fluid seal against any leakage forced up the sleeve portion towards the gate receiving opening of the sleeve portion. Normally, the gate seal is compressed by the gate seal follower to form a seal directly against the first and second valve body portions (and of course the valve gate). However, the applicants believe that a more effective fluid seal is provided by contact with the inner faces of the recessed zone at the terminal, enlarged collar portion of the sleeve portion of the liner. This is in part because both the liner (valve body insert) and the gate seal are made of elstomerically deformable materials, as noted below, and a surface rather than line seal is formed between liner and gate seal. This allows the gate seal follower to apply less compression to the gate seal without excessive risk of leakage. With less compression on the gate seal, the valve gate slides more easily within it. This reduces the size and power of the actuators need to operate the valve. In the long term, less compression on the gate seal reduces wear which in turn extends its operational life.

Preferably, the gate follower is configured to be fixed to both the first and second body parts (of the valve body) with fixing elements that allow the compression of the gate seal to be varied.

Advantageously, the fixing elements comprise a plurality of spaced apart, individually adjustable fixing elements for detachable engagement with the first body part and a plurality of spaced apart, individually adjustable fixing elements for detachable engagement with the second body part. The use of several fixing elements such as bolts on both sides of the gate seal follower allow the compressive load on the gate wiper seal to be uniformly applied or varied and tailored to address any specific leakage issues.

Preferably, the enlarged collar portion of the sleeve portion has a lip positioned for compressive contact with the gate seal.

In a preferred embodiment, the enlarged collar portion has an elongate, rectangular cup-shape with longitudinal side walls extending generally parallel to the plane of the valve gate, and a bottom wall convergingly towards a slot for receiving the valve gate into the remainder of the sleeve portion. Preferably, the above mentioned lip protrudes from the bottom wall and surrounds the slot.

Preferably, the sleeve portion has at least one inwardly protruding sealing lip extending transverse to the sleeve length and positioned between the slot at the enlarged collar section and an entrance to the annular body portion.

Turning then to other relevant (preferred) features, the annular body portion of the liner has a first annular sealing face for sealing against an end of the fluid conduit engaged in the aperture of the first body part, and a second annular sealing face for sealing against an end of the fluid conduit engaged in the aperture of the second body part, the first and second annular sealing faces each having at least one annular sealing lip. In a preferred form, both the first and second annular sealing faces each have an encapsulated metal ring for structural reinforcement and increase in rigidity.

Advantageously, the valve body insert material, and in particular the annular portions encapsulating the metal rings, can be selected from one of the following materials, which listing is non-exhaustive though:
tolulene diisocyanate (TDI) polymers
methylene diphenyl diioscyanate (MDI) polymers
hot cast polymers
cold cast polymers
elastomeric materials.

It is conceivable to form the valve body insert as a unitary component but in which the sleeve portion and the annular portions are made from different materials, each portion optimised to perform their different functions, apart from providing the liner functionality.

Preferably, one side of the valve body insert has a surface feature which keys with a complementary feature in the first body part to ensure the valve body insert is assembled in the first and second body parts in a predefined orientation.

Preferably, the valve body insert is externally dimensioned to be fitted in replaceable manner within correspondingly shaped recesses in walls of the valve body parts when assembled.

Preferably, the valve gate is a generally blade-shaped knife gate formed of high grade steels or exotic alloys, as is known in the art of knife gate valves. The first and second body parts that when assembled provide the valve housing are formed from various grades of cast or ductile irons, aluminium or steel. For certain applications, where operating pressures allow this, suitable polymer resins may be used to provide the castings that form the housing parts, instead of metallic materials.

Preferred embodiments of the present invention will now be described, by of example only, with reference to the accompanying drawings.

DESCRIPTION OF PREFERRED EMBODIMENT

Figure 1:
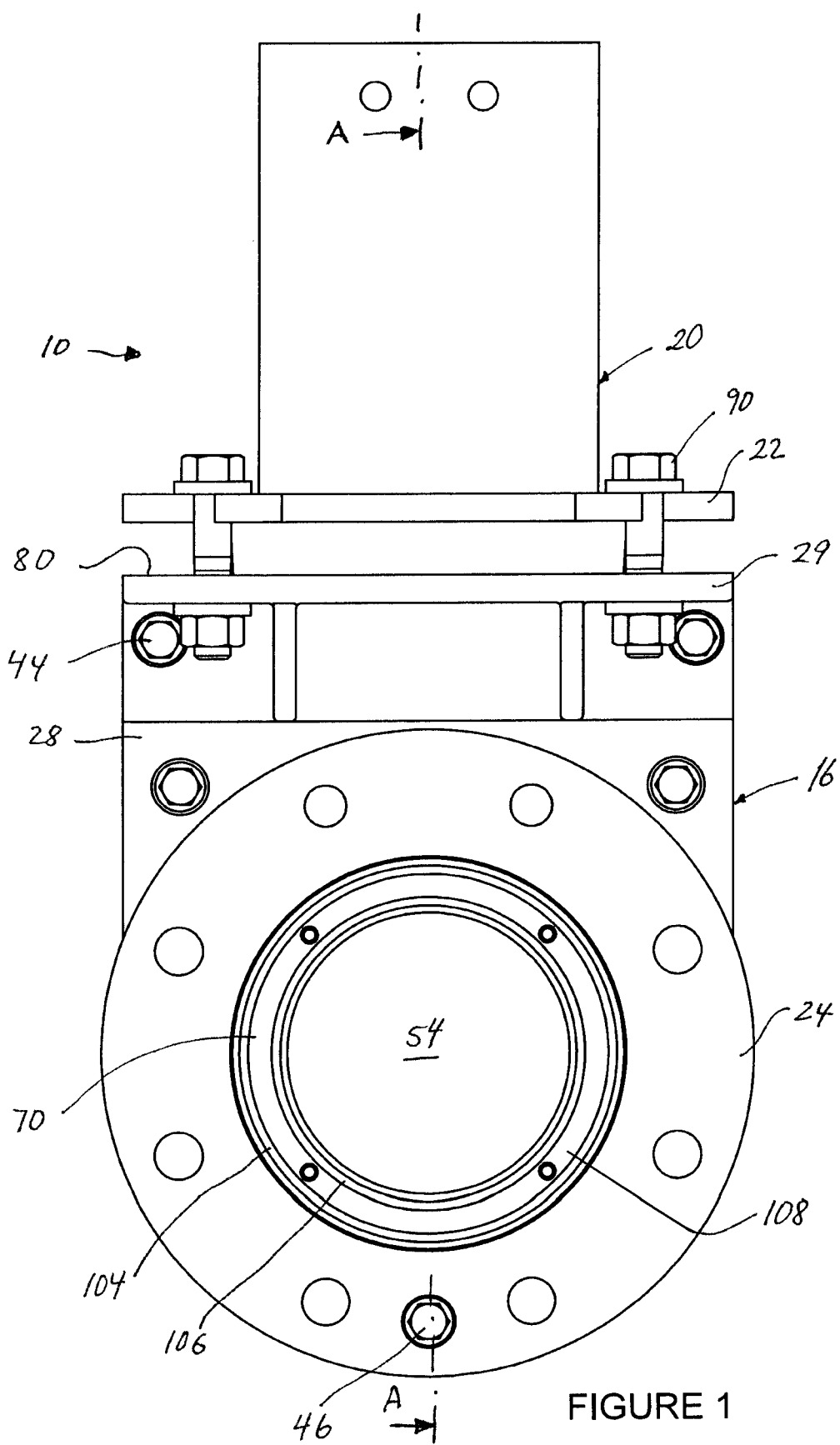
FIG. 1 is a side elevation of a knife gate valve according to an embodiment of the present invention.

In the following, relative terms of reference such as 'upper', 'lower', 'right', 'left' etc. are used to facilitate understanding of the following description provided with reference to the drawings. Where components are not described, the skilled person will appreciate that such features as illustrated but not explained in detail can be embodied as per known knife gate valves.

Referring to the figures generally, knife gate valve 10 includes six main components or parts, a pair of essentially mirror image valve body casting parts 12, 14 which assembled provide the valve body or housing 16, a valve body insert or liner 18, a gate 20, a gate wiper seal 21, a gate seal follower 22 and a non-illustrated actuation mechanism for shifting the position of gate 20 within valve body 16 between an open position in which the valve permits flow of fluid through it, and a closed position, in which the valve shuts off flow.

Valve housing parts 12, 14 each are cast in known manner and with suitable wall thicknesses from suitable materials such as ductile iron, low grade carbon steel or stain less steel, although for certain applications it is conceivable to have the housing halves (parts 12, 14) cast from resins, reinforced if required. Housing parts 12, 14 comprise at a lower end an integral annular fastening flange portion 24, 26 and a gate chest portion 28, 30 which extends upwardly from flange portion 24, 26 and ends in top flange portion 29, 31 that serves to mount the not illustrated gate valve actuation mechanism.

Within each annular flange portion 24, 26 is defined a circular flow passage or conduit half 32, 34. Each gate chest portion 28, 30 in turn has on the sides that face one another in a closed state of the housing, a gate channel section 36, 38 recessed into the wall and bordered by opposite upper legs of u-shaped abutment surface 40, 42 that cooperate and come into abutment when housing halves 12, 14 are joined together. Gate channel sections 36, 38 respectively merge radially into and thus end at the conduit halves 32 and 34 from an upper side thereof.

Reference numbers 44, 46 exemplarily denote fastening bolts which pass through a number of through holes 48, 50 arranged at various locations of valve body parts 12, 14 and which cooperate with fastening nuts (see 52 in FIG. 2) to secure the valve body halves (parts 12, 14) to each other, in known manner, and without a gasket or similar dedicated sealing element interposed between the interfacing abutment surfaces 40, 42.

Figure 2:
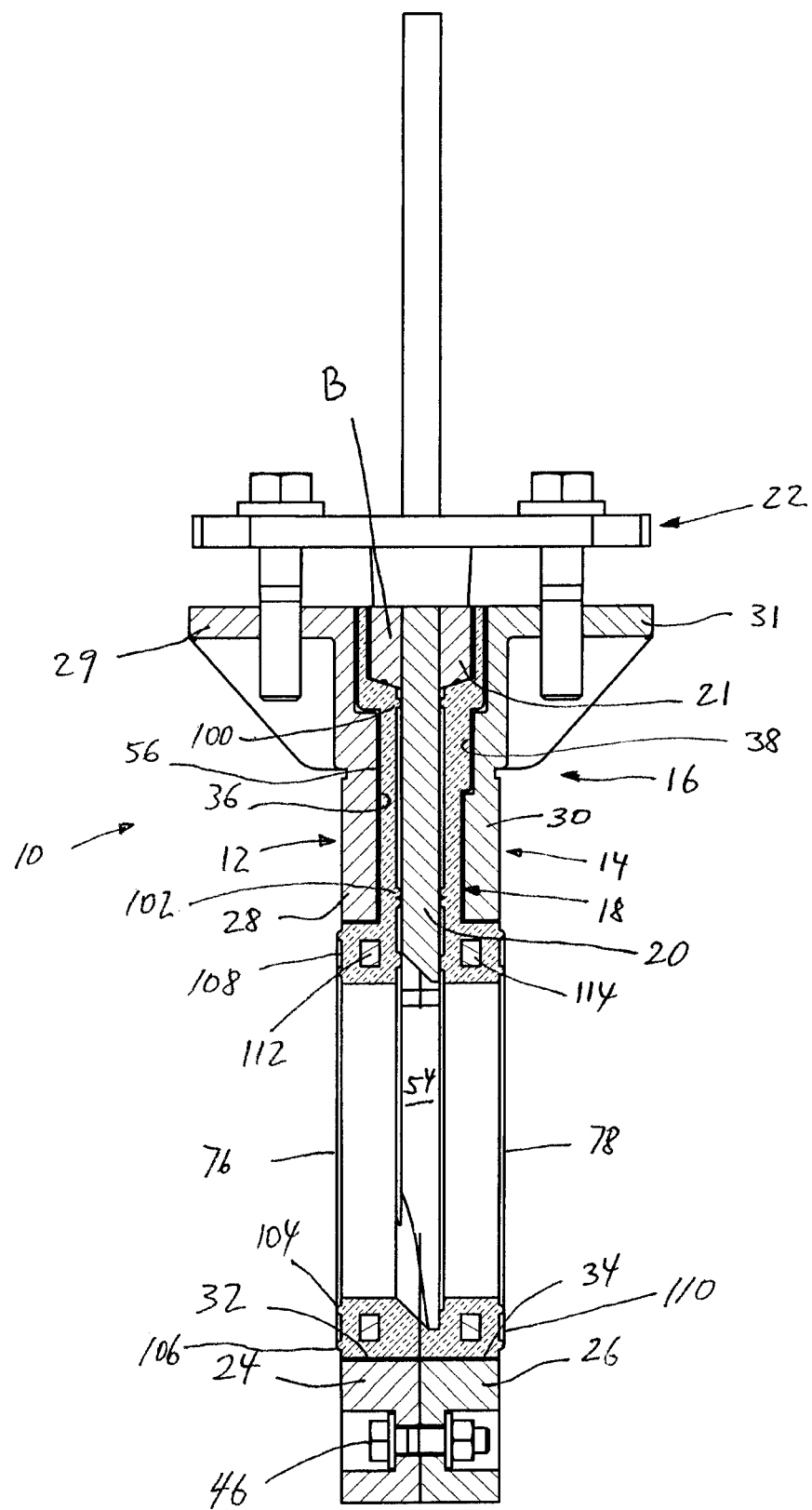
FIG. 2 is a sectional view taken along section line A-A shown in FIG. 1.
Figure 3:
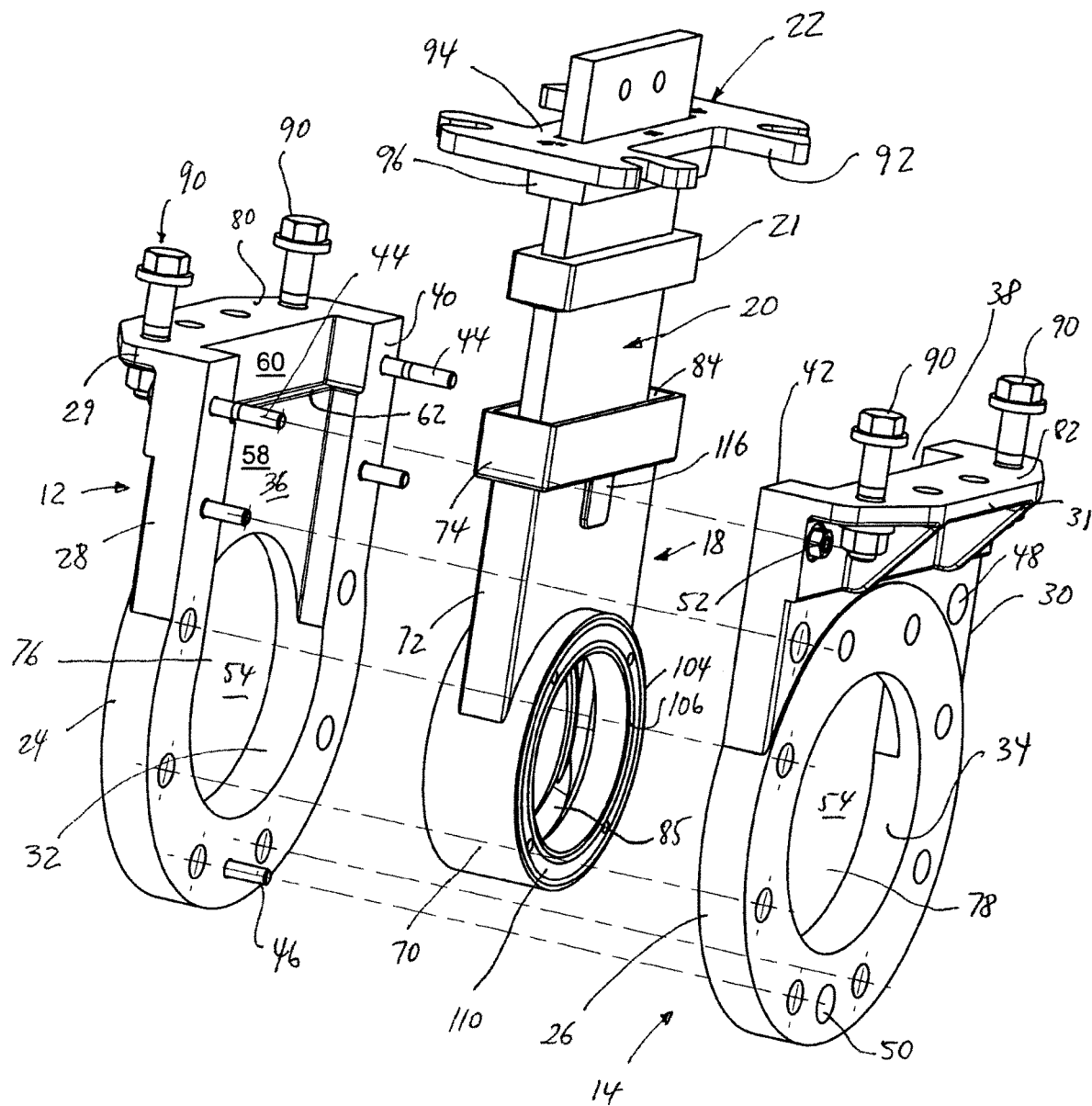
FIG. 3 is an exploded perspective view of the knife gate valve of FIG. 1.

As is best seen in FIGS. 2 and 3, in a closed (assembled) state, the two valve body halves 12, 14 define within and between the gate channel sections 36, 38 of gate chest portions 28, 30 a gate receptacle or cavity 56 of substantially rectangular cross-section. Cavity 56 has a lower portion 58 having smaller clearance dimensions and merges into central flow bore 54, and an upper terminal portion 60 having an increased size in cross-section, whereby a step 62 is formed which extends perpendicular to the side faces of the gate receptacle 56.

The valve body insert 18 is a unitary component made primarily of a polymer material that may be selected from tolulene diisocyanate (TDI) polymers, methylene diphenyl diioscyanate (MDI) polymers, hot cast polymers, cold cast polymers and other elastomeric materials. Insert 18 performs a double liner function within valve housing 16 for all interior faces as will now be described.

Insert 18 comprises a lower annular portion 70 and an upper sheath or sleeve portion 72 of rectangular cross section, whereby the upper terminal end of sheath 72 is enlarged to provide a terminal cup-like collar portion 74 also of rectangular cross section.

The outer contours and the dimensions of valve insert body 18 are chosen such that insert 18 can be sandwiched with preferably a tight sealing fit between the two valve body parts 14 and 16. Annular portion 70 sits concentrically between axial end aperture 76 of flow passage half 32 of the first body part 12 and axial end aperture 78 of flow passage half 32 of the second body part 14, so as to essentially provide a one piece liner for central flow bore 54.

The annular insert portion 70 is integrally formed with sheath (or sleeve) portion 72 in which the valve gate 20 is received to slide between the opened and closed valve positions. Sleeve portion 72 is dimensioned and shaped to line the internal surfaces of gate receptacle 56 formed by gate chest portions 28, 30 of housing parts 14, 16. The rectangular cross-section passageway defined within sheath portion 72 flows/opens into the central flow bore 54 which is lined by annular portion 70. Consequently, any leakage of fluid passing through—or confined by gate 20 to—the central flow bore 54 of valve 10 is up the sleeve (chest) portion 72 of valve insert 18, and does not come into contact with the internal and interface surfaces of the valve body halves 12, 14, in particular up and along the gate channel sections 36, 38 that define the gate receptacle 56 within gate chest portions 28, 30 of the valve housing 16.

Noting the below described leakage minimisation measures, the present invention provides for a design of the upper terminal portion 74 of sleeve portion 72 of the valve liner 18, which in combination with the annular gate wiper seal 21 ensures that any leakage that may take place through the chest liner portion 72 spills out onto the top surface 80, 82 at the top flange portion 29, 31 of the two valve body halves 14, 16. By this measure, leakage is made readily apparent to a visual inspection. Likewise the extent of any corrosion to the exterior of valve housing 16 can be quickly assessed and remedied if necessary. Hidden leakage as can occur with the gate valve seal arrangements of the above described prior art documents is minimised or completely avoided.

All figures show the knife gate valve 10 in an open position with the valve gate 20, which is essentially a plate with a half-circular, knife-like lower perimeter edge, raised such that the central flow bore 54 confined by the circular flow passage or conduit halves 32, 34 in the assembled state of the valve parts 12, 14 shown in FIGS. 1 and 2, is open and unobstructed. In the closed position, gate 20 is slid into sealing engagement with a complimentary formation 85 at the radially inner face of annular portion 70 of insert 18 to close the central flow bore 54.

Enlarged terminal collar portion 74 of insert sleeve portion 72 is formed to further improve the fluid seal at the upper, open terminal end where the valve gate 20 enters insert (liner) 18. Collar portion 74 sits in, and lines the correspondingly enlarged upper portion 60 of gate receptacle 56. Collar portion 74 is a generally elongate rectangular cup-shaped formation with an open ended recess 84 having longitudinal side walls 86 spaced apart by an inclined bottom wall 88 leading to the rectangular slot opening of the rectangular cross-section channel extending downward through the remainder of the sleeve 72 towards its opening at the annular portion 70 of insert/liner 18. The outer contour and dimensions of collar portion 74 is such that when seated it comes to rest at step 62 between upper and lower gate receptacle portions 58, 60.

Figure 4:
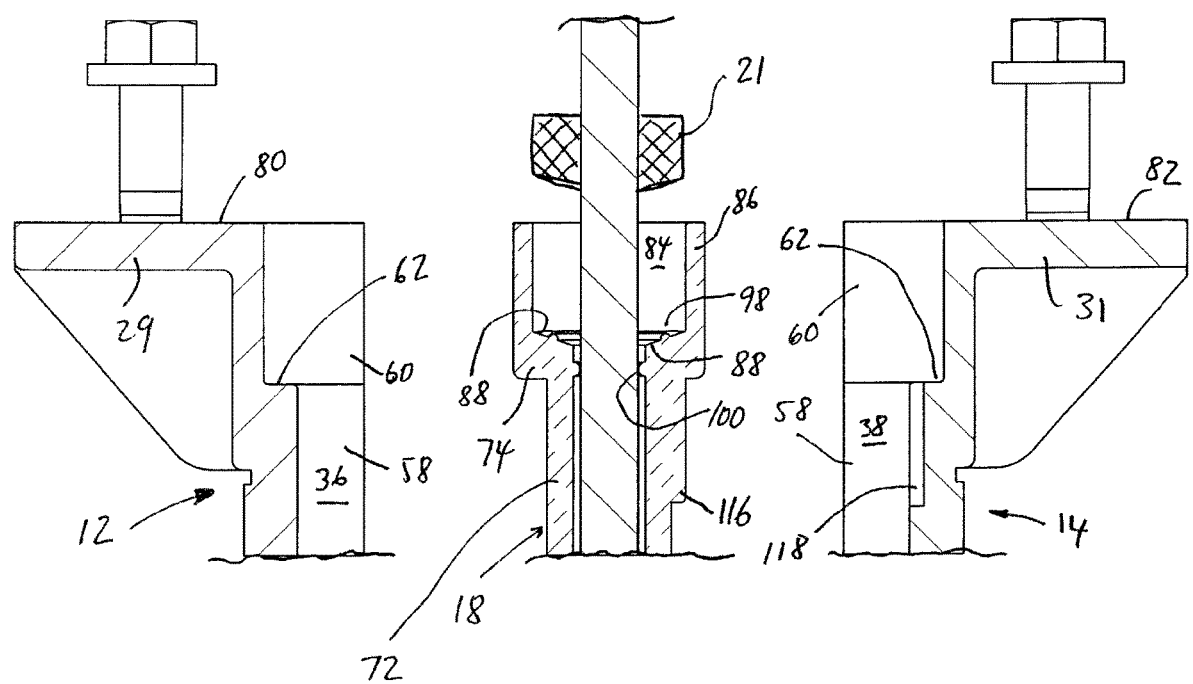
FIG. 4 is an enlarged, partial cross-sectional exploded view of detail B at FIG. 2.

This is best shown in FIG. 4, noting that for the sake of clarity, the abutting fit between the vertically extending, parallel walls 86 of recess 84 and the outer face of gate seal 21 received within the recess 84 is not illustrated. Any gap between the external face of gate seal 21 and the recess side walls 86 is absent, in particular once the gate seal 21 is compressed into the recess 84 by means of gate seal follower 22. The latter is of plate like configuration with four forked arm portions 92 radiating from a central portion 94 and a downward protruding central boss portion which exhibits a rectangular through hole for unobstructed passage of valve gate 20.

Normally, if gate valves of this type use a gate seal 21, which is typically a cold or hot cast polymer, an elastomeric materials, or a co-molded combination of materials, the gate seal 21 seals against the valve gate 20 and directly contacts the inner surfaces of the valve casing halves (parts) 14, 16 that make up the valve body 16, at opposing sides of the seal. The Applicants have enhanced the fluid seal by encasing the gate seal 21 on three sides within recess 84 of enlarged collar portion 74 of sleeve portion 72 of valve insert 18. Because the fluid seal between the gate seal 21 and the more elastic side walls 86 of the collar portion 74 of the valve insert (or liner) 18 is better than a fluid seal provided by direct contact with the metallic valve body casting parts 12, 14, the gate seal follower 22 does not need to apply as much compressive force. With less compressive force acting on the gate seal 21, the knife gate 20 slides more easily between the open and closed positions. This in turn reduces the size and power of the actuators required to operate the valve 10. Furthermore, with less contact pressure between the gate seal 21 and the knife gate 20, the rate of wear is lower and the operational life is extended.

The gate seal follower 22 is biased to perform the above mentioned compression of gate seal 21 within cup-shaped terminal collar portion 74 in known manner using a series of gate seal follower bolts 90 engaging with the gate seal follower plate forked arms 92, tensioning towards the top terminal surface 80, 82 of valve body 16. By using a plurality of bolts 90 (ie more than two; in the embodiment illustrated four) which are located on opposite sides of the downwardly bossed gate seal follower plate 22, the compression on the gate seal 21 can be adjusted to ensure it is uniform, or in some cases non-uniform to address particular leakage issues.

To further improve the fluid seal, several sealing lips are moulded into in particular the sheath (or sleeve) portion 72 of valve body insert 18 at different locations. As perhaps best seen in FIG. 4, In the enlarged terminal collar portion 74, a sealing lip 98 is arranged at and to protrude from the inclined bottom wall 88 of recess 84, and surrounds the sheath's inner passageway through which valve gate 20 extends. Similarly, below the terminal collar portion 74, the rectangular cross-section channel defined within sleeve portion 72 of insert 18 has a sealing lip 100 proximate its upper entry slot and another sealing lip 102 proximate its lower exit slot to the annular insert portion 70.

On the annular insert portion 70, a pair of annular sealing lips 104 and 106 are provided on the axially terminal annular sealing face 108 and the opposite axially terminal annular sealing face 110, respectively. These lips seal against the longitudinal ends of the flanged pipe ends (not illustrated) secured to the first and second valve body parts 14 and 16 respectively. As the fluid pressures are often considerable, the annular insert portion 70 will advantageously include near the annular opposite sealing faces 108 and 110 metal rings 112, 114 encapsulated within the matrix material of the insert body 18 to provide structural reinforcement at the interface between valve body 16 and the not illustrated pipe ends connected thereto.

To ensure that the valve body insert 18 is correctly oriented and assembled within the valve body 16, surface features 116 and 118 (see FIG. 4) such as cooperating tongue and groove or other type of keys, are formed on the insert 18 (such as at the sheath portion 72 near the terminal collar portion 74) and a wall portion of one only of housing part 12 or 14. This ensures that the valve body insert with knife gate with tapered blade tip as used in unidirectional type knife gate valves are assembled in a correct orientation state as regards flow direction through the valve.

By improving the fluid seal, the relatively large and bulky housing halves (14 and 16) typically encountered with prior art designs, could be formed of a relatively cheaper material with lower corrosion resistance than for example stainless steal. The superior fluid seal makes leakage less likely and secondly should leakage occur it is easily identified during a visual inspection while any corrosive damage is restricted to the exterior of the valve.

It will be finally appreciated that in use, valve 10 is installed between flanged terminal ends of fluid/slurry pipes (not illustrated) of a pipeline, or coupled to other conduit types, which are bolted to the annular fastening flanges 24, 26 of valve housing 16, to provide for flow control by the valve 10, as known to the skilled addressee.

The invention has been described herein by way of example only. Skilled workers in this field will readily recognise many variations and modifications which do not depart from the spirit and scope of the broad inventive concept as defined in the appended claims.

REFERENCE NUMBER CONCORDANCE LISTING

10 knife gate valve
12, 14 valve body casting parts
16 valve body or housing
18 valve body insert or liner
20 gate
21 gate (wiper) seal
22 gate seal follower
24, 26 annular fastening flange
28, 30 gate chest portion
29, 31 top flange portion of 28, 30
32, 34 flow passage or conduit half at 24, 26
36, 38 gate channel section of 28, 30
40, 42 abutment surfaces of 12, 14
44, 46 fastening bolts
48, 50 through holes
52 fastening nut
54 central flow bore (of 16 formed by 32 and 34)
56 gate receptacle (of 16 formed by 36 and 38)
58 lower portion of 56
60 upper portion of 56
62 step between 58 and 60
70 lower annular portion of 18
72 upper rectangular-section sheath or sleeve portion of 18
74 terminal collar portion of 72
76, 78 axial end aperture of 32 and 34,
80, 82 top (terminal) surface of 12, 14 (and 16)
84 open ended recess within 74
85 sealing formation at 70
86 (inner) side walls of 84
88 bottom wall of 84
90 gate seal follower bolts
92 gate seal follower plate forked arms
94 gate seal follower central portion
96 gate seal follower boss
98 sealing lip (at 84)
100, 102 sealing lip (at 72)
104, 106 sealing lip
108, 110 axial annular end faces (of 70)
112, 114 metal rings
116, 118 alignment surface features

The invention claimed is:

1. A knife gate valve, comprising:
a valve body having a first body part and a second body part, the first body part and the second body part each having a top surface, the first body part and the second body part each having an interface surface for mating engagement with one another in forming the valve body, and an aperture for coupling to a respective end of a fluid flow conduit, wherein the first body part and the second body part are shaped such that when secured together at the interface surfaces they define a valve gate recess and a flow conduit between the apertures;
a valve gate arranged for reciprocating movement in the valve gate recess between a closed position in which fluid flow through the flow conduit is prevented, and an open position allowing fluid flow past the valve gate;
a valve body insert having a sleeve portion for lining all interior surfaces of the valve gate recess and slideably receiving the valve gate, and an annular body portion integrally formed with the sleeve portion and configured to sit between the apertures in the flow conduit of the valve body and seal against the valve gate in the closed position; and
a gate wiper seal forming a fluid seal against the valve gate and a terminal open end of the sleeve portion in which the gate is received; wherein
the first body part and the second body part together define an enlarged recessed portion at the valve gate recess end remote from the annular body portion and which enlarged recessed portion peripherally surrounds the valve gate; wherein
the sleeve portion of the valve body insert has an enlarged peripherally extending collar portion at and fully surrounding the terminal open end thereof shaped for sealingly seating fully within the enlarged recess portion of the first body part and the second body part substantially flush with an exterior face of the valve body, the enlarged collar portion having an end recess configured for fully accommodating the gate wiper seal within the end recess and substantially flush with the exterior face of the valve body; and wherein
the knife gate valve is constructed and arranged such that any substantial leakage of fluid passing through the flow conduit in normal operation of the knife gate valve is up the sleeve portion of the valve body insert and visible on one or both of the top surfaces of the first body part and the second body part.

2. A gate valve according to claim 1, wherein the valve body insert is made from a material selected from the group consisting of toluene diisocyanate (TDI) polymers, methylene diphenyl diisocyanate (MDI) polymers, hot cast polymers, cold cast polymers and elastomeric materials.

3. A gate valve according to claim 1, wherein one side of the valve body insert has a surface feature which keys with a complementary surface feature in one of either the first body part or the second body part during and following assembly of the valve, wherein the surface features comprise a protruding key and a receiving slot.

4. A gate valve according to claim 1, wherein the sleeve portion has at least one inwardly protruding sealing lip extending transverse to a longitudinal extension of the sleeve portion and positioned between an end slot at the enlarged collar portion and an entrance slot to the annular body portion.

5. A gate valve according to claim 1, wherein the valve body insert is removable and replaceable upon disassembly of the first body part and the second body part.

6. A gate valve according to claim 1, wherein the enlarged collar portion of the sleeve portion has a sealing lip positioned for compressive contact with the gate wiper seal.

7. A gate valve according to claim 6, wherein the sealing lip extends along an entire inner periphery of a valve gate channel defined within the valve body insert.

8. A gate valve according to claim 1, wherein the end recess defined within the enlarged collar portion is rectangular cup-shaped with longitudinal side walls extending generally parallel to a plane of the valve gate and a bottom wall inclined to the longitudinal side walls leading to a slot for receiving the valve gate into the remainder of the sleeve portion.

9. A gate valve according to claim 8, wherein a sealing lip protrudes from the bottom wall and surrounds the slot.

10. A gate valve according to claim 1, wherein the annular body portion of the valve body insert has a first annular sealing face for sealing against an end of a fluid conduit engaged to the aperture of the first body part, and a second annular sealing face for sealing against an end of a fluid conduit engaged to the aperture of the second body part, the first annular sealing face and the second annular sealing face each having at least one annular sealing lip.

11. A gate valve according to claim 10, wherein the first annular sealing face and the second annular sealing face each have an encapsulated metal ring for structural reinforcement.

12. A gate valve according to claim 1, further comprising a gate seal follower arranged for selectively and adjustably compressing the gate wiper seal within the end recess within the enlarged collar portion and against the valve gate thereby increasing contact pressure between the valve gate and the gate wiper seal as well as between the gate wiper seal and the end recess in the enlarged collar portion.

13. A gate valve according to claim 12, wherein the gate seal follower is configured to be selectively fixed to both the first body part and the second body part with fixing elements devised for enabling variation of the compression state of the gate wiper seal within the enlarged collar portion.

14. A gate valve according to claim 13, wherein the fixing elements comprise a plurality of spaced apart, individually adjustable fixing elements for detachable engagement with the first body part and a plurality of spaced apart, individually adjustable fixing elements for detachable engagement with the second body part.

15. A knife gate valve, comprising:
a valve body having a first body part and a second body part, the first body part and the second body part each having a top surface, the first body part and the second body part each having an interface surface for mating engagement with one another in forming the valve body, and an aperture for coupling to a respective end of a fluid flow conduit, wherein the first body part and the second body part are shaped such that when secured together at the interface surfaces they define a valve gate recess and a flow conduit between the apertures;
a valve gate arranged for reciprocating movement in the valve gate recess between a closed position in which fluid flow through the flow conduit is prevented, and an open position allowing fluid flow past the valve gate;
a valve body insert having a sleeve portion for lining all interior surfaces of the valve gate recess and slideably receiving the valve gate, and an annular body portion integrally formed with the sleeve portion and configured to sit between the apertures in the flow conduit of the valve body and seal against the valve gate in the closed position; and
a gate wiper seal forming a fluid seal against the valve gate and a terminal open end of the sleeve portion in which the gate is received; wherein
the first body part and the second body part have an enlarged recessed portion at the valve gate recess end remote from the annular body portion; wherein
the sleeve portion of the valve body insert is of rectangular cross section having a length and a width and has an enlarged collar portion of rectangular cross section having a length and a width greater than that of said sleeve portion at the terminal open end thereof shaped for sealingly seating fully within the enlarged recess portion of the first body part and the second body part substantially flush with an exterior face of the valve body, the enlarged collar portion having an end recess configured for fully accommodating the gate wiper seal within the end recess and substantially flush with the exterior face of the valve body; and wherein
the knife gate valve is constructed and arranged such that any substantial leakage of fluid passing through the flow conduit in normal operation of the knife gate valve is up the sleeve portion of the valve body insert and visible on one or both of the top surfaces of the first body part and the second body part.

* * * * *